Aug. 1, 1967  R. B. LORD  3,333,675
SELECTIVE DISCHARGE CONVEYOR
Filed Oct. 15, 1965  9 Sheets-Sheet 1

INVENTOR
ROGER B. LORD

BY *Browne, Schuyler, & Beveridge*

ATTORNEYS

Aug. 1, 1967    R. B. LORD    3,333,675
SELECTIVE DISCHARGE CONVEYOR
Filed Oct. 15, 1965    9 Sheets-Sheet 2

INVENTOR
ROGER B. LORD

BY *Browne, Schuyler, & Beveridge*

ATTORNEYS.

INVENTOR
ROGER B. LORD
BY Browne, Schuyler, & Beveridge
ATTORNEYS.

Aug. 1, 1967  R. B. LORD  3,333,675
SELECTIVE DISCHARGE CONVEYOR
Filed Oct. 15, 1965  9 Sheets-Sheet 4

INVENTOR
ROGER B. LORD
BY Browne, Schuyler, & Beveridge
ATTORNEYS

INVENTOR
ROGER B. LORD

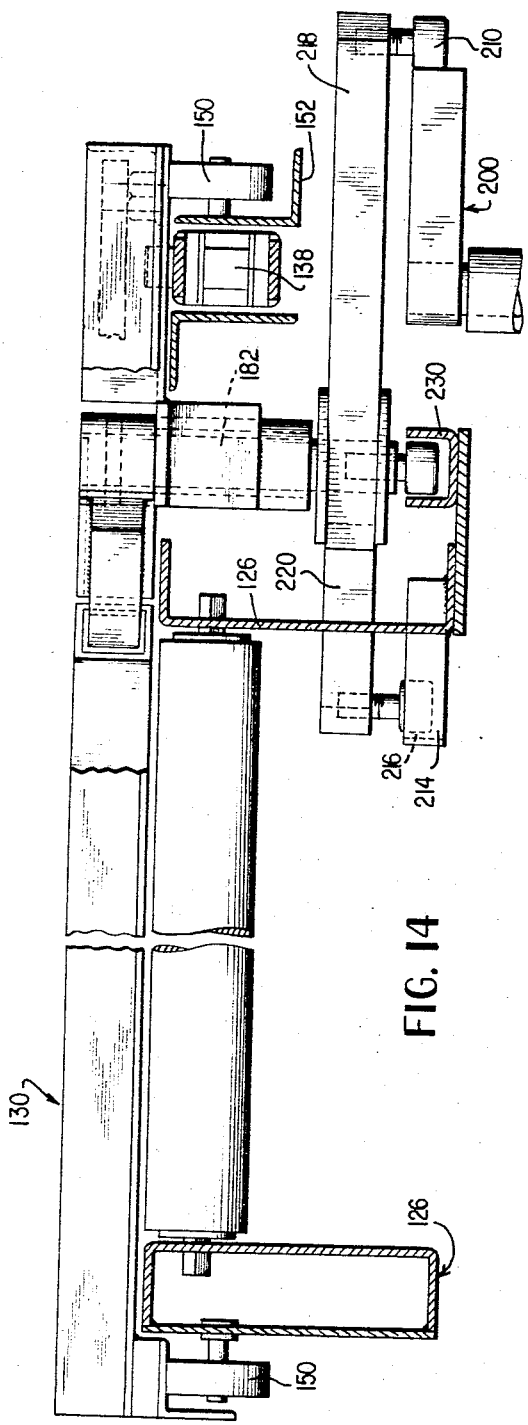
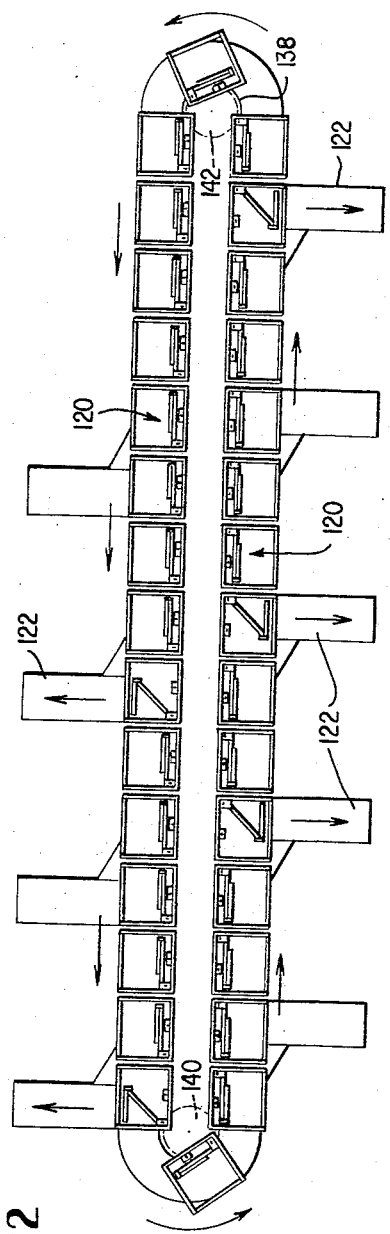
FIG. 14
FIG. 12
INVENTOR
ROGER B. LORD
BY Browne, Schuyler, & Beveridge
ATTORNEYS

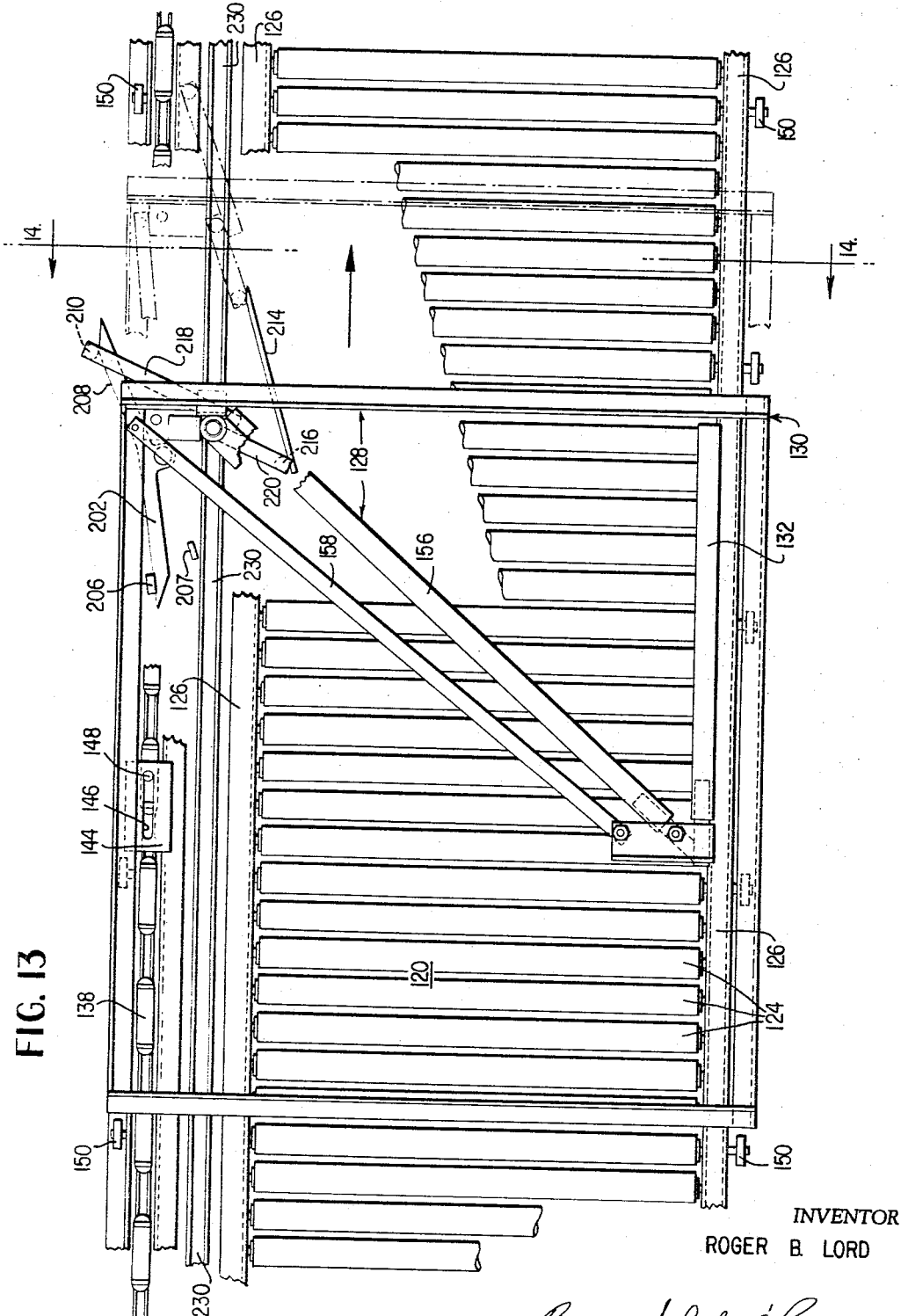

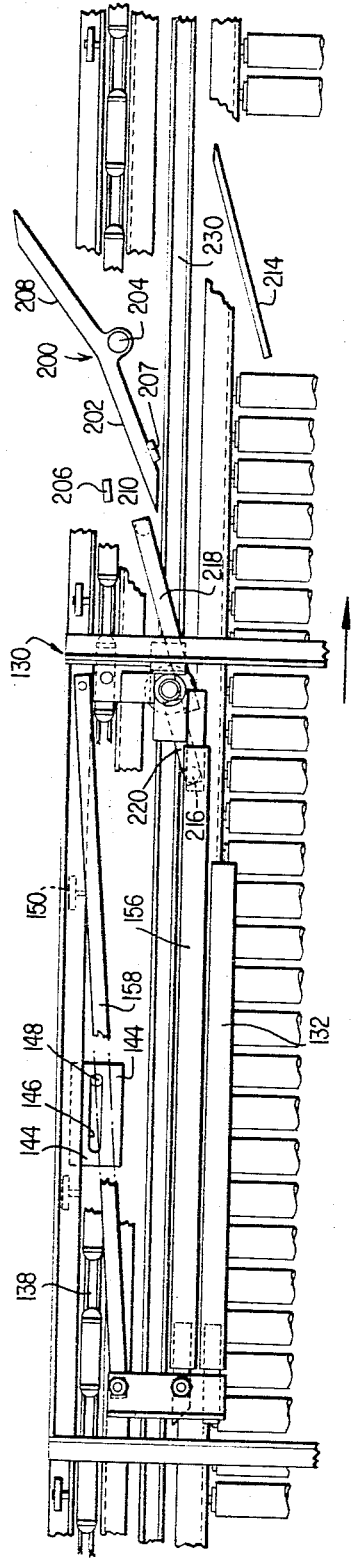

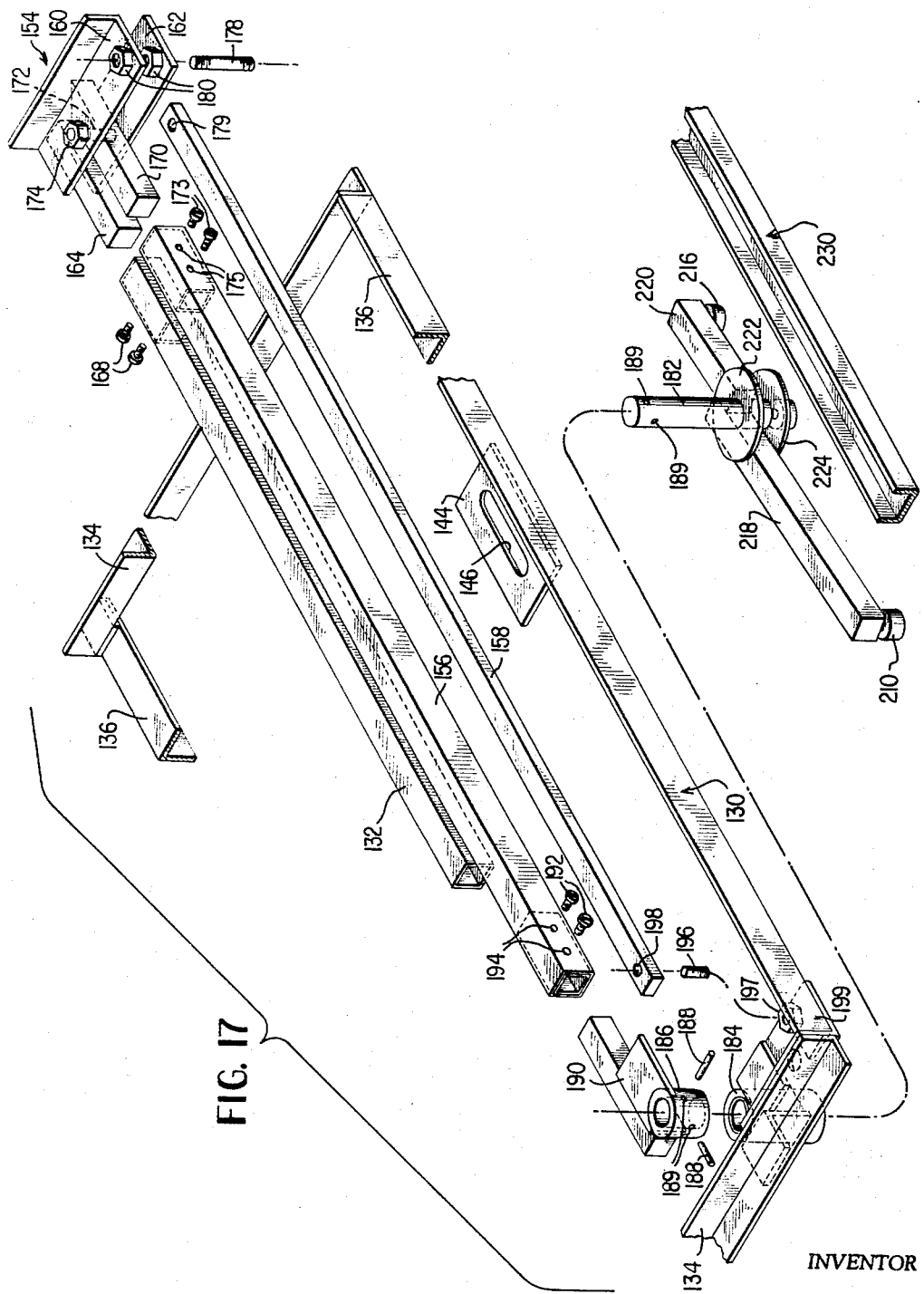

_United States Patent Office_  3,333,675
Patented Aug. 1, 1967

3,333,675
SELECTIVE DISCHARGE CONVEYOR
Roger B. Lord, 604 Essex Ave.,
Spring Lake Heights, N.J. 07762
Filed Oct. 15, 1965, Ser. No. 496,334
34 Claims. (Cl. 198—28)

This invention relates to article conveyors which convey articles along a predetermined path for selective discharge at one or more stations usually situated laterally of the path.

One of the objects of the present invention is to provide a novel conveyor which will convey articles along a predetermined path and subsequently discharge them at one or more selectable discharge stations in a highly improved manner.

A further object of the present invention is to provide a novel mechanism for discharging articles laterally from a predetermined conveyor path.

A still further object of the present invention is to provide a novel mechanism for both pushing articles along a predetermined path and selectively discharging them at one or more locations along the path.

Yet another object of the present invention is to provide such a selective discharge conveyor which is quite versatile while being smoothly operable at relatively high speeds and without breakdown to effect rapid and efficient handling of articles over long periods of repeated or continuous use.

The above and other objects are achieved by a conveyor having an elongated article supporting surface defining a path along which articles are to be conveyed from a loading station for example at one end of the conveyor path and one or more discharge stations disposed laterally of the path downstream of the loading station. Articles are moved along the path from the loading station to the various discharge stations and selectively discharge laterally from the conveyor path at the discharge stations by a mechanism which includes a pusher element for pushing articles along the path and an associated discharge element which moves transversely across the path to engage and push articles laterally off the path at the discharge stations. A plurality of such associated pusher and discharge elements are provided to move over the path in longitudinally spaced interrelationship.

In one embodiment of the invention, the pusher and discharge elements are rigidly attached at right angles to each other while in another embodiment of the invention the pusher element is formed by a rectangular tray and the discharge element by an arm mounted to the tray for movement therewith along the path and for movement across the path relative to the associated tray for discharging articles.

Movement of the pusher and discharge elements are obtained through an endless drive member such as a chain which is located at one side of the path for movement along the path. The pusher and discharge elements are connected at longitudinally spaced locations to the drive chain for movement therewith over the path. Movement of each discharge element across the path is obtained through an associated pivot which rotates about a vertical axis. In the first embodiment mentioned above, this pivot is mounted for rotational movement directly onto the drive chain while in the second embodiment mentioned above, the pivot is rotatably mounted to the tray which in turn is connected to the drive chain as described above.

Rotation of the pivot to actuate the associated discharge element across the path for discharging articles is obtained through a cam and cam follower arrangement. The latter includes what will be referred to as a "discharge cam" movable between an operative or extended position for engagement with a cam follower attached to the pivot; and a retracted or inoperative position which permits the cam follower to pass without engagement such as when it is not desired to discharge articles at a particular discharge station. The discharge cams are located along the path of conveyance just before each of the discharge stations and may be actuated into the operative and inoperative positions by any suitable mechanism such as a solenoid. In an alternative arrangement the discharge cams are moved into the operative positions by a solenoid, for example, and returned to the inoperative positions by a second cam surface formed on each discharge cam so as to be engaged by the cam follower after the discharge element associated with the cam follower has moved to its discharge position.

After the discharge elements have moved across the path to discharge articles in the manner described above, the discharge elements are automatically returned to their normal, or non-discharge position on the opposite side of the conveyor path by another cam and follower arrangement. The latter includes a plurality of what will be referred to as "return cams" located along the path just downstream of the discharge stations respectively and a plurality of cooperable return cam followers respectively fixed to the actuating pivots associated with each of the discharge elements. Rather than being movably mounted as are the discharge cams, the return cam are stationary so that return of the discharge elements to their normal, non-discharge position will always result automatically, that is, non-selectively.

In order to stabilize movement of the pusher and discharge elements over the conveyor path, a guide track is provided below the path to receive the lower portions of the actuating pivots associated with the pusher and discharge elements. In one embodiment of the invention, a portion of this guide track is bent outwardly towards the conveyor path at an oblique angle to form the return cams. Additionally in this embodiment, the return cam followers are slidably received in the track during movement between the discharge stations so as to restrain movement of the discharge element out of its non-discharge position while moving between the discharge stations. Movement of the discharge elements at the discharge station as desired however is permitted by cut-out portions in the guide track allowing the return cam followers to move out of the track as the discharge element is being moved across the path for discharge.

The nature of the invention including other objects and advantages thereof will be more readily understood from the following detailed description in conjunction with the accompanying drawings in which:

FIG. 12 is a schematic plan view of a conveyor representing another embodiment of the present invention;

FIG. 13 is an enlarged, fragmental, plan view of the conveyor of FIG. 12 showing a discharge arm thereof in discharge position;

FIG. 14 is an enlarged cross-sectional view with portions broken away taken along lines 14—14 of FIG. 13;

FIG. 15 is an enlarged, fragmental plan view similar to FIG. 13 but illustrating the discharge arm in normal position just prior to discharging articles from the conveyor;

FIG. 16 is a view similar to FIG. 15 but illustrating the discharge arm in a position intermediate those shown in FIGS. 13 and 15; and FIG. 17 is an enlarged, exploded view in perspective of a combined pusher and discharge mechanism in the conveyor of FIG. 12.

Figure 1:
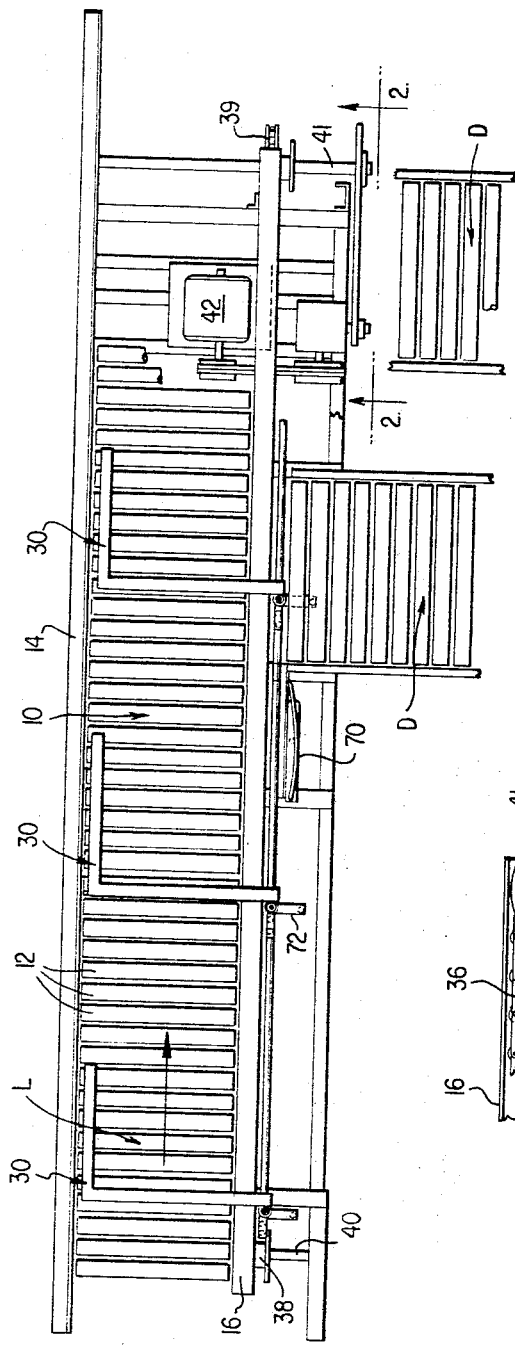
FIG. 1 is a plan view of a conveyor embodying the present invention.
Figure 5:
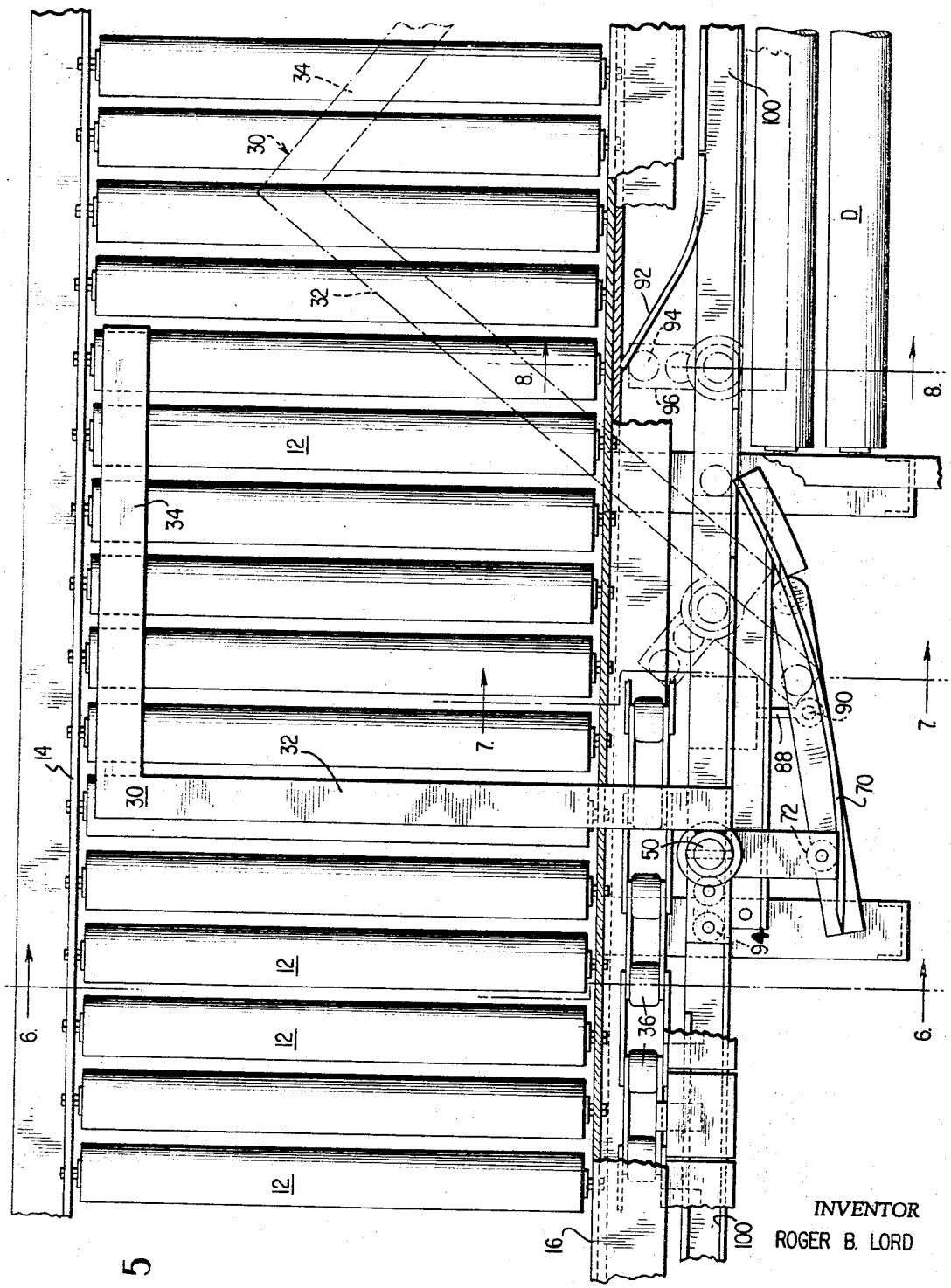
FIG. 5 is an enlarged view similar to FIG. 3 but showing the discharge cam in operative position while additionally illustrating a return cam also included in the conveyor.
Figure 6:
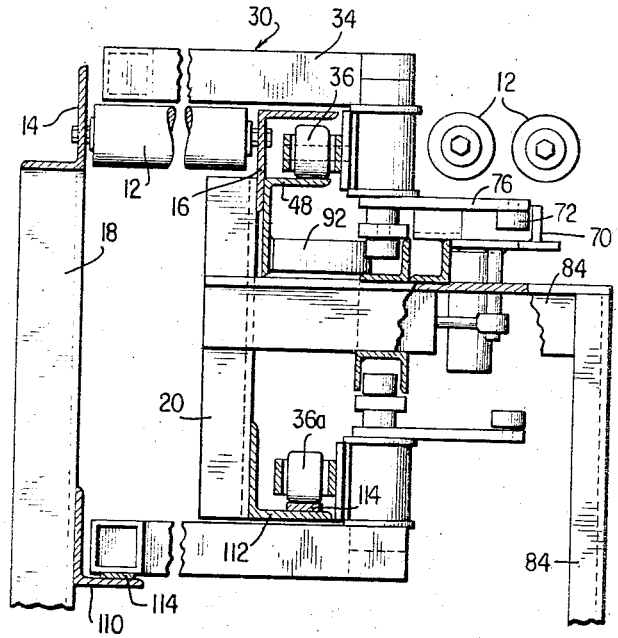
FIG. 6 is an enlarged, fragmental, cross-sectional view taken generally along lines 6—6 of FIG. 5.

Referring to the drawings in detail, FIG. 1 shows a conveyor illustrating one embodiment of the present invention including a bed of rollers 12 defining a linear path 10 along which articles are supported and conveyed between a loading station at one end designated L and one or more discharge stations D disposed laterally of the conveyer at its opposite end. Article support rollers 12 are mounted for rotation about fixed axes in a pair of transversely spaced L-shaped channels 14 and 16 which are secured to suitable support structures 18 and 20 as shown in FIGS. 5 and 6. At discharge stations D any suitable conveyor may be provided such as the shown gravity conveyors.

In accordance with the present invention articles, from loading station L, are conveyed along path 10 and selectively discharged at stations D by means of a novel pusher and discharge mechanism. This mechanism, in the present embodiment, includes a plurality of L-shaped arms 30 disposed in longitudinally spaced relationship closely over conveyor path 10. Arms 30 may be formed from any suitable rigid material and in the shown embodiment, they are formed from metallic tubes of rectangular cross-section including a portion 32 which normally extends transverse of path 10 to form an article pusher and a portion 34 fixed at right angles to pusher 32 to form a discharge arm cooperable with pusher 32 in discharging articles laterally of path 10.

Figure 2:
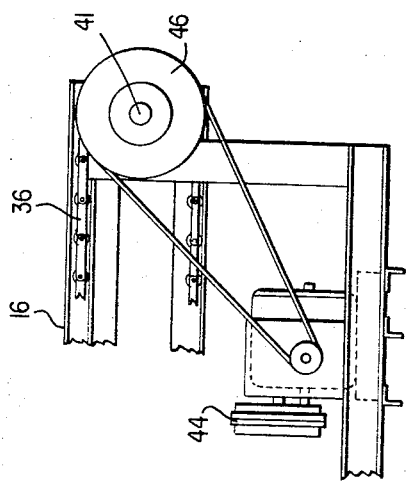
FIG. 2 is an enlarged fragmental elevational view taken along lines 2—2 of FIG. 1.
Figure 4:
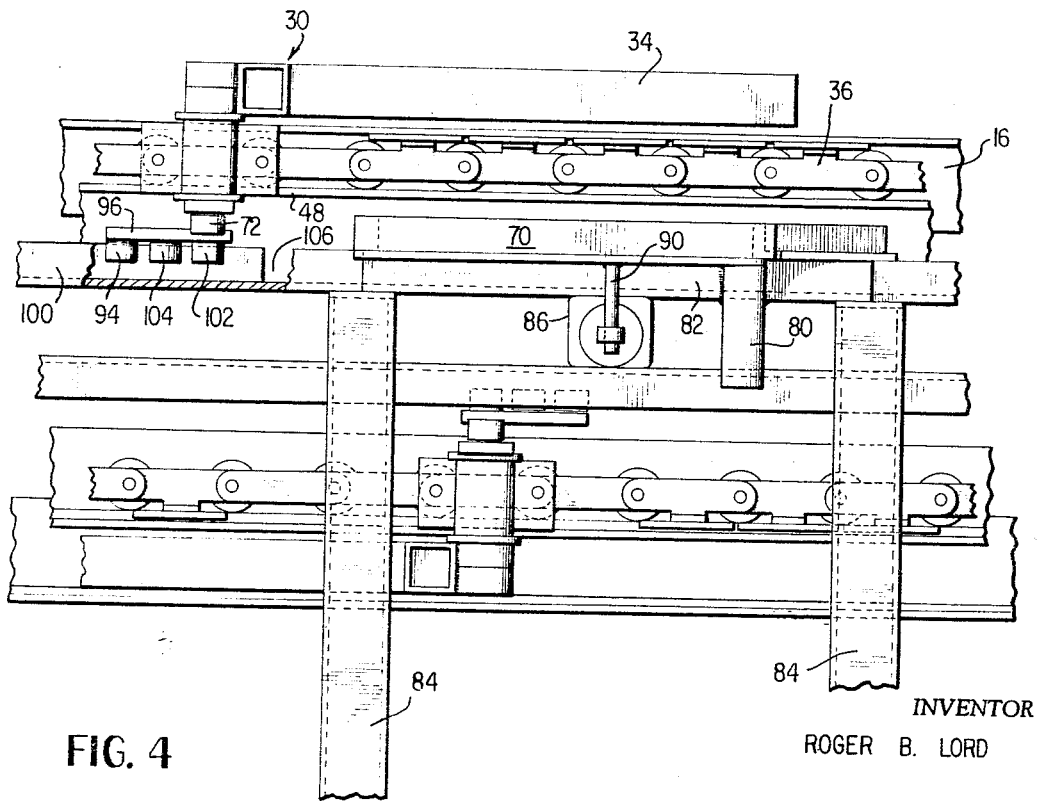
FIG. 4 is an enlarged elevational view of the conveyor fragment shown in FIG. 3.

Pusher and discharge arms 30 are movable in the direction of path 10 for conveying articles and laterally of the path for discharging articles. Mounting of arms 30 for movement over conveyor path 10 is accomplished through an endless drive member shown as a chain 36 located on one side of the path about end sprockets 38 and 39 which rotate about horizontally disposed shafts 40 and 41 extending transverse to the conveyor path as shown in FIG. 1. Any suitable motor and pulley arrangement may be provided for driving chain 36, a typical motor 42 and pulley system 44, 46 which drives sprocket 39, being shown in FIG. 1 and 2. The upper run of drive chain 36 is received and supported in an elongated passage formed by roller support channels 16 together with an underlying inverted L-shaped channel 48 fixed to support structure 20 as shown in FIGS. 4 and 6.

Figure 9:
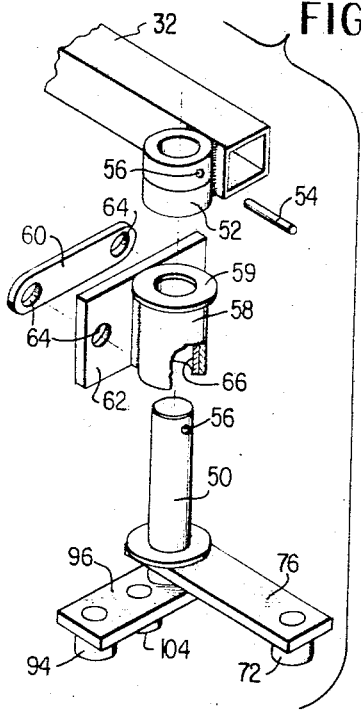
FIG. 9 is an enlarged, exploded view in perspective of a pivot assembly with associated cam followers included in the conveyor of FIG. 1.

Connection of pusher and discharge arms 30 to drive chain 36 for rectilinear movement therewith along the path and for selective movement across the path at discharge stations D is accomplished by vertically disposed pivots 50 respectively fixed to each arm 30 and mounted to chain 36 at longitudinally spaced locations for pivotal movement relative to the chain about vertical axes. In the specific form as shown in FIG. 9, each pivot 50 is fixed at the upper end to an associated arm 30 by a vertically disposed sleeve 52 secured, such as by welding, to the end of arm portion 32 adjacent drive chain 36. Pivots 50 are fixed in their respective sleeves 52 by pins 54 received through aligned radial apertures 56 in sleeves 52 and pivots 50.

Referring to FIG. 9, each pivot 50 is rotatably mounted to drive chain 36 in the shown embodiment by a flanged sleeve 58 fixed in vertical position to an outer link 60 of drive chain 36. Sleeve 58 receives the intermediate portion of pivot 50 with arm mounting sleeve 52 bearing on flange 59 of sleeve 58. Connection to chain link 60 is through a planar backing member 62 welded to sleeve 58 and fixed to chain link 60 by fasteners (not shown) received in aligned apertures 64. If desired, a liner 66 of soft metal or nylon for example may be provided in sleeves 58 to reduce wear and friction.

Selective actuation of pivots 50 to move arms 30 from a normal position shown in FIG. 1 for pushing articles along path 10 to a discharge position generally to one side of path 10 (as shown in phantom in FIG. 5) for laterally discharging articles from path 10 is obtained through a cam mechanism. This mechanism includes a plurality of discharge cams 70 respectively located just before discharge stations D and a plurality of cooperable cam followers 72 respectively fixed to pivots 50. In the embodiment of FIGS. 1–9, followers 72 are mounted to arms 76 which are fixed to and project outwardly at right angles from pivots 50. When pusher and discharge arms 30 are in the position shown in FIG. 1 for pushing articles along the path, cam follower arms 72 project laterally outwardly of conveyer path 10.

Figure 3:
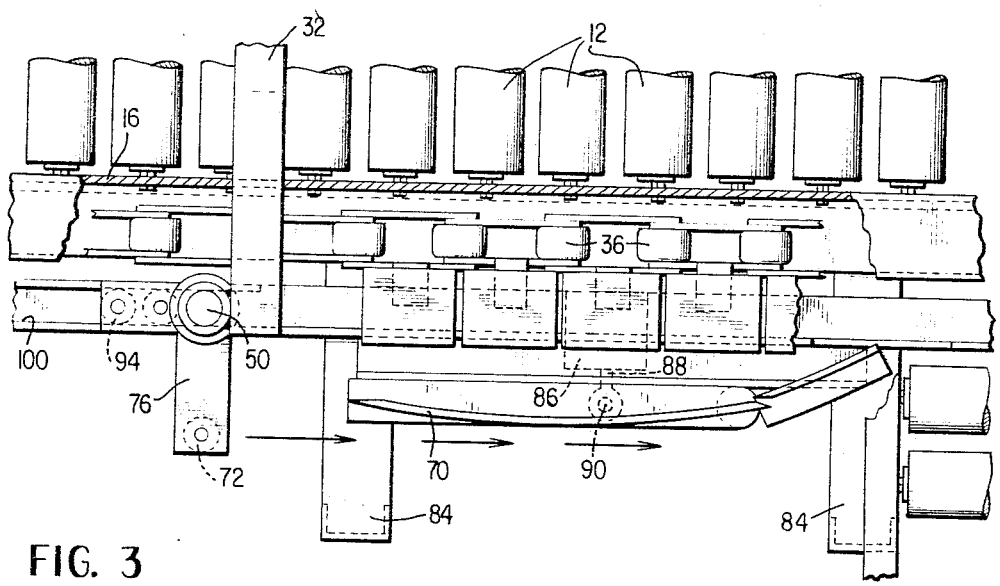
FIG. 3 is an enlarged fragmental plan view of the conveyor illustrating an included discharge cam in retracted position.
Figure 7:
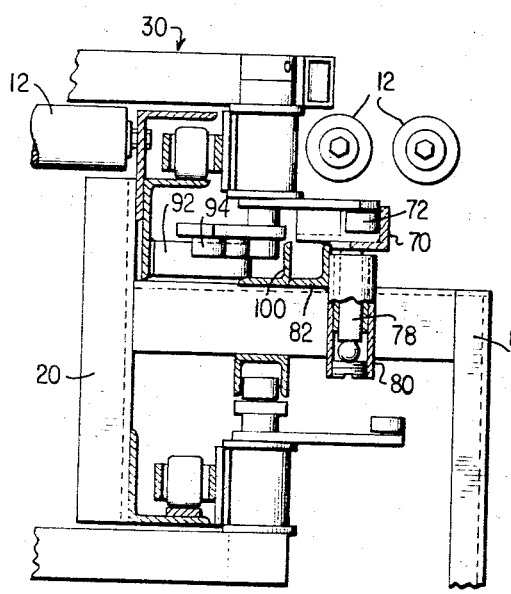
FIG. 7 is an enlarged, fragmental cross-sectional view taken generally along lines 7—7 of FIG. 5.

Discharge cams 70 are movable between a position (see FIG. 5) extending oblique to the path of conveyance for engaging discharge cam followers 72 to cause pivoting of arms 30 into discharge position; and a normal or retracted position (see FIGS. 1 and 3) extending generally parallel to the path of conveyance for permitting discharge cam followers 72 to pass without engagement and consequent pivotal movement of arms 30 to discharge position. Referring to FIGS. 3, 4 and 7, discharge cams 70 are mounted for movement between their operative and inoperative positions by a pivot 78 rigidly depending from discharge cams 70 respectively intermediate their ends. Discharge cam pivots 78 are each received in a bearing sleeve 80 fixed in vertical position to suitable support structure shown as an L-shaped channel 82 which extends along a portion of conveyor path 10 and is fixed on a pair of right angular support legs 84. Support legs 84 project outwardly from support structures 20 to support discharge cams 70 while the latter pivot between their operative and inoperative positions.

Selective actuation of discharge cams 70 between their operative and inoperative positions may be provided in any suitable manner such as by solenoids 86 employed in the presently described embodiment. Each solenoid 86 has a horizontally disposed actuating plunger 88 suitably connected to a stem 90 which is fixed and depends from a discharge cam 70 intermediate the ends of the discharge cam as shown in FIGS. 3 and 4.

Return of pusher and discharge arms 30 from their pivoted discharge positions at one side of path 10 to their article pushing or normal positions is obtained through another cam mechanism which includes a plurality of return cams 92 located in advance or downstream of discharge cams 70 respectively and a plurality of return cam followers 94 respectively fixed to arm pivots 50. In the specific embodiment shown, cam followers 94 are each mounted to an arm 96 rigidly secured to the bottom of arm pivots 50 at right angles to discharge cam follower arm 76 as best shown in FIG. 9.

Figure 8:
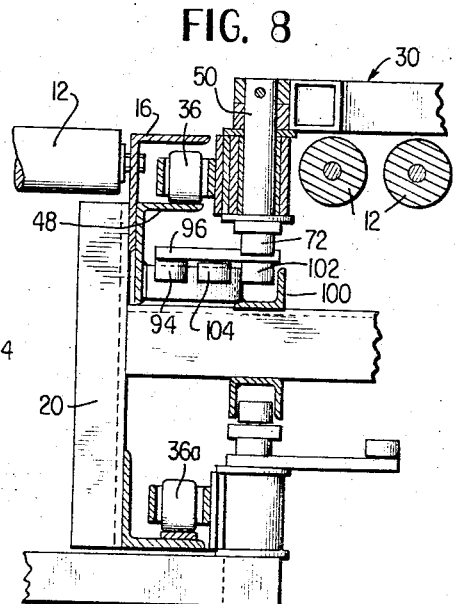
FIG. 8 is an enlarged, fragmental, cross-sectional view taken generally along lines 8—8 of FIG. 5.

In order to stabilize movement of pusher and discharge arms 30 along conveyor path 10 while restraining arms 50 against movement out of their article pushing position, a guide track shown as a U-shaped channel 100 is provided below arm pivots 50 so as to receive a slide 102 fixed on each of discharge cam follower mounting arms 96 as shown in FIGS. 4 and 8. If desired, an additional slide 104 may be provided on mounting arms 96 between return cam followers 94 and slides 102.

Referring to FIG. 5, return cams 92 in the shown embodiment are formed by portions of the inner side wall of track 100, which portions are bent outwardly from the track towards roller bed 12 at an angle of approximately 30°. The location and arrangement of return cams 92 and their cooperable followers 94 are such that after a pusher and discharge arm 30 has moved to its discharge position and continues to move with drive chain 36, the associated return cam follower 94 will engage return cam 92 (as shown in phantom in FIG. 5) and continued movement will cause counter-clockwise movement of arm 30 back to its normal or article pushing position illustrated in FIG. 1. It will thus be seen that while discharge movement of arms 30 is selectively controlled, return movement to their article pushing position is automatic by virtue of the fixed position of return cams 92.

To permit movement of return cam followers 94 and their mounting arms 96 out of track 100 when pusher and discharge arms 30 are being cammed into discharge position, inner side wall portions of track 100 preceding return cams 92 are cut away to provide apertures 106 (see FIG. 4) of sufficient size to accommodate return cam follower mounting arms 96.

After pusher and discharge arms 30 have discharged articles and return to their normal nondischarge position, arms 30 continue to the end of the conveyor after which they move along the lower run 36a of drive chain 36 in the position illustrated in FIGS. 6 and 8. To support and stabilize arms 30 while travelling with lower run 36a of the drive chain, an L-shaped channel 110 is fixed to support structure 18 as shown in FIG. 6. Similarly, an L-shaped channel 112 is secured to support structure 20 to underlie and support lower chain run 36a. Preferably, low friction bearings 114 are provided on channels 110 and 112 to engage arms 30 and chain 36a as shown in FIG. 6.

In operation, assuming motor 42 is energized to actuate drive chain 36, articles are loaded in any suitable manner within the general confines of pusher and discharge arms 30 as they pass loading station L. Movement of drive chain 36 causes pusher element 32 to engage and move the loaded articles along roller bed 12. If it is desired to discharge an article at the first discharge station D for example, solenoid 86 associated with this station is energized to extend the related discharge cam 70 into its operative position whereupon discharge cam follower 72 of the approaching arm 30 will engage discharge cam 70 and be cammed thereby to pivot arm 30 (clockwise as illustrated by the phantom lines in FIG. 5) to push the article from path 10 onto the discharge conveyor.

After discharge of the article in the aforegoing manner, return cam follower 94 will engage return cam 92 (as shown in phantom in FIG. 5) to pivot the arm 30 counter-clockwise back to its normal position for subsequent reloading at station L.

Figure 10:
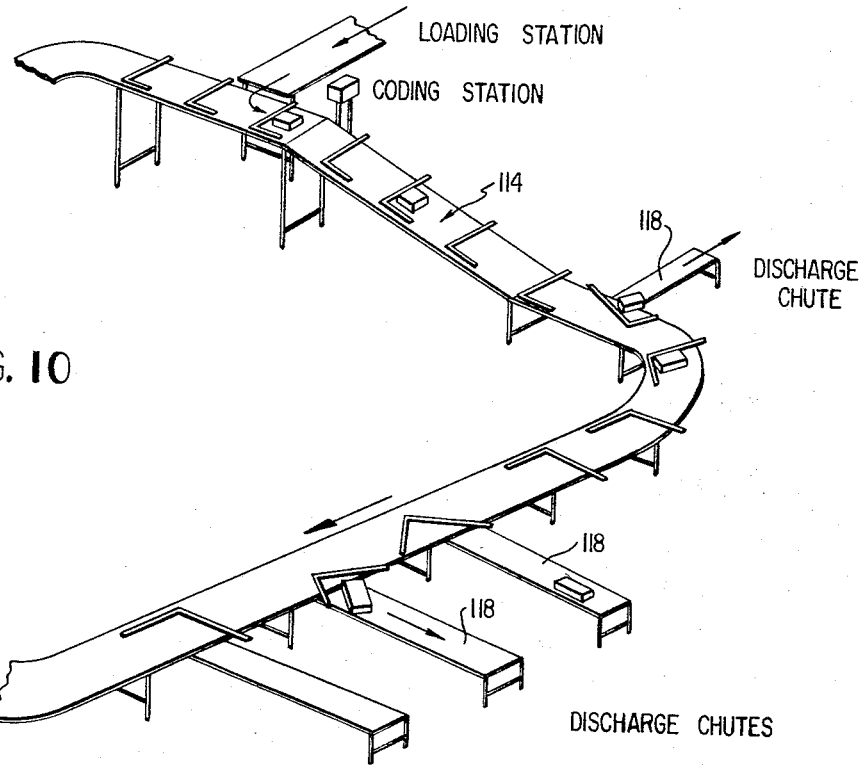
FIG. 10 is a schematic view in perspective illustrating a modification of the conveyor of FIG. 1.
Figure 11:
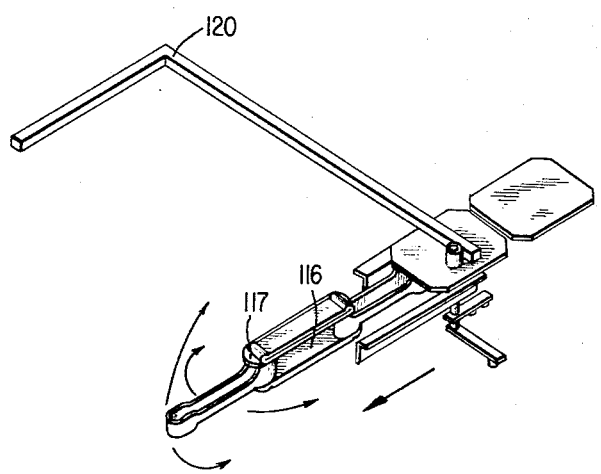
FIG. 11 is an enlarged perspective view of a combined pusher and discharge arm and an associated drive chain included in the conveyor of FIG. 10.

FIGS. 10 and 11 schematically illustrate a modification of the aforedescribed embodiment wherein the support for the articles and the path of conveyance are provided by a slider bed 114. This embodiment is particularly suitable where the path of conveyance is irregular or varies in elevation as illustrated. To permit the drive chain 116 to adjust to differences in elevation during its course of travel, drive chain 116 is formed with suitable linkages 117 permitting movement of the chain about vertical and horizontal axes as indicated in FIG. 11. Additionally, the embodiment in FIGS. 10 and 11 illustrates the use of discharge chutes 118 rather than the gravity roller beds in the above-described embodiment. The combined pusher and discharge arms 120 and their associated discharge and return cams and cam followers may be formed identically to those described above.

Referring now to FIG. 12, there is illustrated another conveyor embodying the invention of the type capable of moving articles along a continuous double run horizontal path 120 for selective discharge at various stations 122 disposed laterally of the path on both runs thereof. As in the above-described embodiment of FIG. 1, the path of conveyance 120 may be formed by a plurality of transverse rollers 124 mounted for rotation about fixed axes in opposite elongate mounting channels 126.

In accordance with the invention, there is provided a novel pusher and discharge mechanism generally designated 128 including a plurality of longitudinally spaced pushers shown as discharge trays 130 which move the articles along path 120 and discharge arms 132 which push the articles laterally from path 120 at discharge stations 122 as selected. In the shown embodiment, each tray 130 is rectangular and formed by opposite pairs 134 and 136 of metallic channel members which define an enclosure dimensioned to receive articles to be conveyed. As shown in FIGS. 13 and 14 trays 130 extend laterally beyond opposite sides of path 120 and chain 36 where they are supported for slideable movement in close overlying relationship to path 120 by a plurality of longitudinally spaced rollers 150 rotatably mounted on one side of path 120 in roller support channel 126 and on the other side of path 120 in L-shaped channel 152.

Trays 130 are moved in close overlying relationship with path 120 by means including an endless drive member, shown as a chain 138, which extends in a horizontal plane along the inside of conveyance path 120. Drive chain 138 is mounted on opposite end sprockets 140 and 142 which are suitably journalled for rotation about vertical axes; one of sprockets 140, 142 being driven by a suitable motor (not shown) while the other sprocket being the idler. Connection of trays 130 to longitudinally spaced portions of drive chain 138 may be effected in any appropriate manner such as by the shown brackets 144 which are fixed to the inner sides of the trays and have elongated apertures 146 receiving suitable fasteners 148 fixed to drive chain 138. Apertures 146 are elongated to permit trays 130 to move about end sprockets 140, 142, in a facilitated manner.

For discharging articles at stations 122, discharge arms 132 are respectively mounted on trays 130 for movement across path 120 from a nondischarge position on one side of the tray as shown in FIG. 15 to a discharge position on the opposite side of path 120 as shown in FIG. 13; discharge arms 132 remaining substantially parallel to path 120 at all times. Mounting each discharge arm 132 for this movement is a connector generally designated 154 rigidly fixed at right angles to arm 132; and a pair of pivotable links including a drive link 156 and a stabilizing link 158 each having their opposite ends pivotably mounted to connector 154 and the associated tray 130.

In the illustrated embodiment as best shown in FIG. 17, each connector 154 is formed by a pair of overlying plates 160, 162 between which is fixed a laterally projecting stud 164 received in an end of one of the discharge arms 132 which have a tubular configuration. Set screws 168 received through threaded apertures in arms 132 are employed to secure arms 132 to studs 164 against relative movement. Drive link 156 similarly has a tubular shape and receives a second stud 170 which is pivotally connected between plates 160, 162 by a vertically disposed bolt 172 and cooperable nuts 174. Drive link stud 170 is fixed in the end of drive link 156 by set screws 173 received in apertures 175 in drive link 156. Stabilizing link 158 is directly pivoted between plates 160, 162 by a vertically disposed bolt 178 received through aperture 179 in stabilizing link 158 and a pair of nuts 180 cooperable with bolt 178.

Pivotally mounting the opposite end of each drive link 156 to the associated tray 130 is a vertical pivot 182 rotatably received in a sleeve 184 fixed in vertical position, such as by welding, to the tray generally at one corner thereof. Pivot 182 projects from the upper end of fixed sleeve 184 where it is received in a second sleeve 186 and fixed therein against relative movement by pins 188 radially received through aligned apertures 189 in sleeve 186 and pivot 182. Sleeve 186 is in turn rigidly connected to drive link 156 by an adapter plate and stud 190 received in the end of drive link 156 and fixed therein by set screws 192 received through apertures 198 in drive link 156. Each stabilizing link 158 is pivoted to its associated tray 130 by a bolt 196 secured by a nut 197 in vertical position in aligned apertures 198 formed in stabilizing link 158 and a corner plate 199 of tray 130.

Referring to FIG. 15, it will be seen that upon counterclockwise rotation of pivot 182 drive link 156 will rotate counterclockwise along with stabilizing link 158 to move discharge arm 132 substantially rectilinearly across tray 130 while maintaining the discharge arm in a longitudinal or parallel position relative to conveyance path 120. This longitudinal position of discharge arm 132 is maintained through the restraining action of stabilizing link 158. Reverse or clockwise rotation of pivot 182 (as viewed in FIG. 17) causes discharge arm 132 to be returned to its nondischarge position shown in FIG. 17.

As in the above-described embodiment of FIG. 1, rotation of pivots 182 to actuate their associated discharge arms 132 between their retracted and extended positions is accomplished by cams located along the path generally at the discharge stations and cam followers rigidly connected to actuating pivots 182. In the presently described embodiment, the discharge cams are generally wing-shaped members 200 including a discharge camming surface 202 disposed in a vertical plane on the side opposite the conveyor path as shown in FIGS. 15 and 16. Discharge cams 200 are pivotable about vertical axes 204 between retracted positions shown in FIG. 13 where the discharge cam followers 210 will pass by camming surfaces 202 without engagement; and an extended or operative position shown in FIGS. 15 and 16 wherein camming surface 202 will engage discharge cam followers 210 to move the associated discharge arm 132 across the tray.

To limit movement of discharge cams 200 while defining the operative and inoperative positions thereof, fixed stops 206 and 207 are provided on opposite sides of each discharge cam as shown in FIGS. 13, 15 and 16. Selective actuation of discharge cams 200 from their inoperative positions to their operative positions may be provided by any suitable means such as solenoids which may form stops 207.

Return movement of discharge cams 200 to their inoperative positions is automatically effected in this embodiment by a second camming surface 208 formed on cams 200 to project outwardly at an obtuse angle from camming surface 202. In this manner, cam followers 210, upon continued movement beyond camming surface 202 after articles have been discharged, will engage surfaces 208 to pivot discharge cams 200 back into their inoperative positions as determined by stops 206.

Referring to FIG. 13, return movement of discharge arms 132 from their extended or discharge positions to their retracted positions (shown in FIG. 15) is accomplished by stationary return cams 214 positioned below and obliquely to the conveyor path so as to be engageable with return cam follows 216. In the presently described embodiment cam followers 210 and 216 are mounted respectively to arms 218 and 220 which oppositely project from each pivot 182. As shown in FIG. 17, cam follower mounting arms 218 and 220 in the specific embodiment are fixed relative to their associated drive pivot 182 through a pair of overlying washers 222, 224 fixed on pivot 182 with arms 218 and 220 welded, for example to washers 222, 224.

As in the embodiment of FIG. 1, movement of trays 130 and discharge arm 132 along the conveyor path is stabilized by a continuous guide track 230 shown as a U-shaped channel positioned under the conveyor path to receive low friction slides 232 fixed to the bottom of pivots 182. In the embodiment of FIG. 12, however, cam follower mounting arms 218 and 220 are spaced above track 230 so as to be free to move between their various positions.

From the foregoing, it will be appreciated that the present invention provides a conveyor which will convey articles of various sizes and shapes in positive positions and at high speeds and yet will effectively discharge articles at selected stations without stopping conveyance of the articles which follow. Moreover, the cam and follower mechanism of the present invention provides a relatively simple but unique selective discharge actuating system.

Other modifications and adaptations of the structure described above will become readily apparent to persons skilled in the art but without departure from the spirit and scope of the invention indicated in the appended claims.

What is claimed is:

1. An article conveyor comprising in combination; support means defining a generally straight path along which articles are to be conveyed, an article discharge member engageable with articles for discharging same laterally of said generally straight path intermediate the opposite ends thereof, means for moving said discharge member along said generally straight path from one end of said path to the other end of said path, means positioned intermediate the ends of said generally straight path for moving the discharge member across the path intermediate the ends thereof for discharging articles laterally of the path while the discharge member continues to move along the generally straight path.

2. The combination defined in claim 1 wherein said second recited means includes a discharge cam follower fixedly connected with respect to said discharge member and a discharge cam located intermediate the opposite ends of said path to be engageable with said discharge cam follower for camming same to move said discharge member across said path for discharging articles intermediate the opposite ends of said path.

3. The combination defined in claim 2 further including third means for returning said discharge member from a discharge position located generally at one side of said path to a normal non-discharge position, said third means including a return cam follower fixedly connected with respect to said discharge member and a return cam located along said path in advance of said discharge cam to be engageable with said return cam follower to move said discharge member into normal non-discharge position from the discharge position.

4. The combination defined in claim 2 wherein said second recited means includes a pivot fixed to said discharge member and depending generally perpendicularly therefrom, and wherein said discharge cam follower is fixed with respect to said pivot.

5. The combination defined in claim 4 further including an elongated track positioned below said path receiving a portion of said pivot to guide the same in movement along said path.

6. The combination defined in claim 1 wherein said first recited means includes a rectilinearly movable drive member movable along said path and wherein said discharge member is connected with respect to said drive member for movement therewith along said path and also for movement relative to said drive member across said path for discharging articles.

7. An article conveyor comprising in combination; support means defining a path along which articles are to be conveyed, at least one discharge station at one side of said path, and a mechanism for moving articles along said path and for laterally discharging same at said discharge station, said mechanism including a discharge arm movable over said path in the direction thereof and actuating means for moving said discharge arm across said path to engage and push articles off said path at said discharge station, said actuating means including a cam follower connected to said discharge arm and a cam positioned at said discharge station to cooperate with said cam follower to cause said discharge arm to move across said path for discharging articles, said cam being selectively movable between a first position for engaging said follower to cause said discharge arm to move across said path for discharging articles and a second position permitting said cam follower to pass said cam without camming engagement therewith.

8. The conveyor defined in claim 7 wherein said cam has a projecting portion engageable by said cam follower after said cam follower passes said cam for moving said cam to said second position.

9. An article conveyor comprising in combination; article support means defining a path along which articles are to be conveyed, at least one discharge station at one side of said path, and mechanism for pushing articles along said path and for laterally discharging same at said discharge station, said mechanism including a discharge arm movable over said path in the direction thereof, means mounting said discharge arm for movement across said path between a first position generally at one side of said path and a second position located towards the other side of said path, said mounting means including a pivot fixed to said discharge arm and depending generally perpendicularly therefrom, a discharge cam follower fixed with respect to said pivot, a discharge cam located generally at said discharge station to engage said discharge cam follower to cause said arm to move from said first position across said path into said second position for discharging articles, a return cam follower fixed with respect to said pivot and a return cam located along said path in advance of said discharge cam for engaging said return cam follower to cause said discharge arm to return to said first position, an elongated track positioned below said path in parallel relationship therewith, said track receiving a portion of said pivot to guide the same in movement along the path, means mounting said discharge cam for movement between a first discharge position for engaging said discharge cam follower to cam the same for discharging articles and a second position for spacing said discharge cam from said discharge cam follower to permit said discharge cam follower to pass said discharge cam without camming engagement, and solenoid means for actuating said discharge cam into said first position thereof.

10. The conveyor defined in claim 9 wherein said pivot has a cam follower mounting arm projecting therefrom generally at right angles, said discharge cam follower is fixed on said mounting arm, said return cam follower is angularly spaced 90° from said discharge cam follower and normally slideable in said track when said discharge arm is in said first position, said track having a laterally disposed opening located generally at said discharge station for permitting said return cam follower to move out of said track when said discharge cam follower is cammed by said discharge cam.

11. The conveyor defined in claim 9 wherein said pivot has a first mounting arm projecting laterally therefrom on one side of said track, said discharge cam follower is mounted to said first mounting arm, said pivot has a second mounting arm projecting laterally therefrom on the opposite side of said track, and said return cam follower is mounted to said second mounting arm.

12. An article conveyor comprising in combination; article support means defining a path along which articles are to be conveyed, at least one discharge station at one side of said path, a pusher engageable with said articles for moving them along said path, means mounting said pusher for movement over and along said path for moving articles along said path, a discharge arm, means mounting said discharge arm for movement across said path for engaging articles to discharge them at said station, first actuating means for moving both said pusher and discharge arm over and along said path, and second actuating means for moving said discharge arm across said path to discharge articles.

13. The conveyor defined in claim 12 wherein said first actuating means includes an endless drive member movable in the direction of said path and said means mounting said discharge arm includes a pivot connected to said discharge arm and to said endless drive member.

14. The conveyor as defined in claim 12 wherein said second actuating means includes a cam follower fixedly connected to said discharge arm and a cam located adjacent said discharge station for engaging said cam follower to cause movement of said discharge arm across said path at said discharge station.

15. The conveyor defined in claim 13 further including a track extending in the direction of said path and slideably receiving a portion of said pivot to guide said pivot and thereby stabilize movement of said discharge arm along said path.

16. The conveyor defined in claim 13 wherein said pusher includes a portion extending generally transverse to said path, and wherein said pivot and discharge arm are movable relative to said pusher in discharging articles.

17. The conveyor defined in claim 16 wherein said pusher is a tray defining an article receiving area, said tray including means mounting said pivot for rotation relative to said tray, and said discharge arm includes a portion resting on said tray and movable relative thereto in discharging articles.

18. The conveyor defined in claim 12 wherein said pusher and said discharge arm are connected for movement as a unitary body.

19. The conveyor defined in claim 18 wherein said pusher and said discharge arm are elongated members fixed at right angles to each other with said pusher extending transverse to said path and said discharge arm extending along said path when said pusher is in the position for conveying articles along said path.

20. An article conveyor comprising article support means defining a path on which articles are to be conveyed, means for moving articles along said path, at least one discharge station at one side of the path, a discharge arm extending longitudinally over said path, means mounting said discharge arm for movement across said path to discharge said articles between a first position on one side of said path and a second position on the opposite side of said path, said means mounting said discharge arm including a connecting member rigidly fixed to said arm and extending generally transverse to said path at right angles to said arm, a pair of generally parallel link arms having one of their ends pivotally connected to said connecting member, means mounting the other ends of said link arms for pivotal movement, actuating means for rotating one of said link arms about its pivot axis on said other end thereof to move said discharge arm across said path for discharging articles, endless drive means movable adjacent said path in the direction of said path, and means connecting said link arms to said endless drive means for movement therewith along said path.

21. The conveyor defined in claim 20 wherein said means for moving the articles along said path includes a pusher member extending across said path and connected to said endless drive means for movement therewith along said path and wherein said mounting means for said link arms is included on said pusher member.

22. The conveyor defined in claim 20 wherein said means for moving articles along said path includes a tray having one end extending generally across said path for engaging articles to push the same along said path and wherein said link arms are pivotally connected at said one of their ends to said tray adjacent said one end of the tray with intermediate portions of said link and discharge arms resting on an opposite end of said tray.

23. The conveyor defined in claim 20 wherein said actuating means for rotating one of said link arms includes a pivot fixed to said one link arm, cam follower means fixed to said pivot and cam means located adjacent said discharge station for engaging said cam follower means to rotate said pivot to thereby actuate said link arms and said discharge arm.

24. The conveyor defined in claim 22 further including bearing means on opposite sides of said path slideably supporting said tray in overlying relationship to said path.

25. For use in a selective discharge conveyor or the like, a combined pusher and discharge mechanism comprising a tray including a side portion adapted to engage and push articles along a conveyor path, a discharge arm disposed generally at right angles to said side portion, means mounting said discharge arm to said tray for substantially rectilinear movement relative to said side portion and in a path parallel thereto for discharging articles laterally from a conveyor path, said means including a link having opposite ends connected to said tray and discharge arm for pivotal movement relative thereto.

26. The mechanism defined in claim 25 wherein said means further includes a stabilizing link parallel to said first link and having opposite ends connected to said tray and discharge arm for pivotal movement relative thereto.

27. For use in a selective discharge conveyor or the like, a combined article pusher and discharge means comprising a pusher adapted to engage and push articles along a conveyor path, a discharge arm adapted to engage and push articles transversely across a conveyor path, and means connecting said discharge arm to said pusher for movement with said pusher along a conveyor path but permitting movement of said discharge arm relative to said pusher transversely across the conveyor path for discharging articles transversely from the conveyor path.

28. The combined article pusher and discharge means defined in claim 27 wherein said means connecting said discharge arm to said pusher includes a pivotal connection.

29. The structure defined in claim 28 wherein said last recited means further includes a link having opposite ends pivotally connected with respect to said pusher and said discharge arm for pivotal movement relative thereto.

30. The structure defined in claim 29 wherein said last recited means further includes a stabilizing link having its opposite ends pivotally connected with respect to said pusher and said discharge arm for pivotal movement relative thereto.

31. An article conveyor comprising in combination; support means defining a path along which articles are to be conveyed, at least one discharge station at one side of said path, and a mechanism for moving articles along said path and for laterally discharging same at said discharge station, said mechanism including a discharge means movable over said path in the direction thereof and having a portion extending longitudinally with respect to said path, and actuating means for moving said portion of said discharge means across said path between two positions generally on opposite sides of said path to engage and push articles laterally off said path at said discharge station.

32. The article conveyor as defined in claim 31 wherein said means defining a path includes a stationary support surface.

33. The article conveyor defined in claim 31 further including a plurality of discharge stations located laterally of said path, and a plurality of actuating means including portions respectively located generally at said discharge stations for moving said discharge means across said path at said discharge stations to laterally discharge articles from the path.

34. The article conveyor defined in claim 33 wherein each of said actuating means includes selectively operable means whereby said discharge means and consequently discharge of the articles from the path are selectively controlled.

References Cited

FOREIGN PATENTS 198,192    6/1958    Austria.

EVON C. BLUNK, *Primary Examiner.*

M. L. AJEMAN, *Assistant Examiner.*